United States Patent
Kageyama et al.

(10) Patent No.: US 11,053,714 B2
(45) Date of Patent: Jul. 6, 2021

(54) DOOR LATCH POWER SUPPLY DEVICE, DOOR LATCH POWER SUPPLY SYSTEM, AND VEHICLE USING SAME

(71) Applicant: Panasonic Intellectual Property Management Co., Ltd., Osaka (JP)

(72) Inventors: Youichi Kageyama, Fukushima (JP); Takashi Higashide, Fukushima (JP); Katsunori Atago, Fukushima (JP); Kazuo Takenaka, Fukushima (JP); Hisao Hiragi, Saitama (JP); Yugo Setsu, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/635,028

(22) PCT Filed: Jul. 18, 2018

(86) PCT No.: PCT/JP2018/026969
§ 371 (c)(1),
(2) Date: Jan. 29, 2020

(87) PCT Pub. No.: WO2019/054046
PCT Pub. Date: Mar. 21, 2019

(65) Prior Publication Data
US 2020/0263460 A1     Aug. 20, 2020

(30) Foreign Application Priority Data
Sep. 14, 2017   (JP) ............................. JP2017-176778

(51) Int. Cl.
*E05B 81/86*   (2014.01)
*H02J 50/10*   (2016.01)
(Continued)

(52) U.S. Cl.
CPC ............ *E05B 81/86* (2013.01); *B60R 16/033* (2013.01); *E05B 81/80* (2013.01); *H02J 7/0068* (2013.01); *H02J 50/10* (2016.02)

(58) Field of Classification Search
CPC .......... E05B 81/86; E05B 81/80; H02J 50/10; H02J 7/0068; H02J 50/00; H02J 7/0047;
(Continued)

(56) References Cited

U.S. PATENT DOCUMENTS

| 10,480,222 B2 * | 11/2019 | Funahashi ............... E05B 77/12 |
| 2008/0000711 A1 * | 1/2008 | Spurr ...................... E05B 81/86 180/289 |

(Continued)

FOREIGN PATENT DOCUMENTS

| JP | 8-189238 | 7/1996 |
| JP | 2007-032140 | 2/2007 |

(Continued)

OTHER PUBLICATIONS

The Extended European Search Report dated Jun. 12, 2020 for the related European Patent Application No. 18855618.7.
(Continued)

*Primary Examiner* — Jared Fureman
*Assistant Examiner* — Michael J Warmflash
(74) *Attorney, Agent, or Firm* — Westerman, Hattori, Daniels & Adrian, LLP

(57) ABSTRACT

A door latch power supply device includes an electricity storage unit, a charger, a discharger, a contactless power receiver, an input port configured to be connected to an external power supply, an output port configured to be connected to an actuator, and an operation signal receiver configured to receive an operation signal sent in response to an operation for opening a door. While an input voltage input to the input port is higher than or equal to a first input
(Continued)

threshold, the charger operates using power supplied from the external power supply so as to cause a storage voltage of the electricity storage unit to become a first storage voltage value, and the discharger outputs power in the electricity storage unit to the output port to place the actuator in the unlatched state in response to the operation signal received by the operation signal receiver. While the input voltage is lower than the first input threshold, the charger operates using power supplied from the contactless power receiver so as to cause the storage voltage to become a second storage voltage value, and then the discharger outputs power in the electricity storage unit to the output port to place the actuator in the unlatched state in response to the operation signal received.

9 Claims, 6 Drawing Sheets

(51) Int. Cl.
*B60R 16/033* (2006.01)
*E05B 81/80* (2014.01)
*H02J 7/00* (2006.01)

(58) Field of Classification Search
CPC .... H02J 2310/40; H02J 7/342; H02J 2207/50; H02J 2207/40; H02J 7/0049; H02J 7/345; B60R 16/033; B60R 16/03

See application file for complete search history.

(56) References Cited

U.S. PATENT DOCUMENTS

| 2011/0203336 A1* | 8/2011 | Mette ..................... E05B 81/76 70/277 |
| 2016/0060909 A1* | 3/2016 | Krishnan ................ E05B 81/86 292/194 |
| 2016/0153216 A1* | 6/2016 | Funahashi ............... E05B 81/56 292/2 |
| 2016/0340940 A1* | 11/2016 | Krishnan ........... G07C 9/00309 |
| 2017/0089104 A1* | 3/2017 | Kowalewski ......... B60R 25/403 |

FOREIGN PATENT DOCUMENTS

| JP | 2012-034534 | 2/2012 |
| JP | 2015-140639 A | 8/2015 |
| WO | 2014/156016 | 10/2014 |

OTHER PUBLICATIONS

International Search Report of PCT application No. PCT/JP2018/026969 dated Aug. 28, 2018.

* cited by examiner

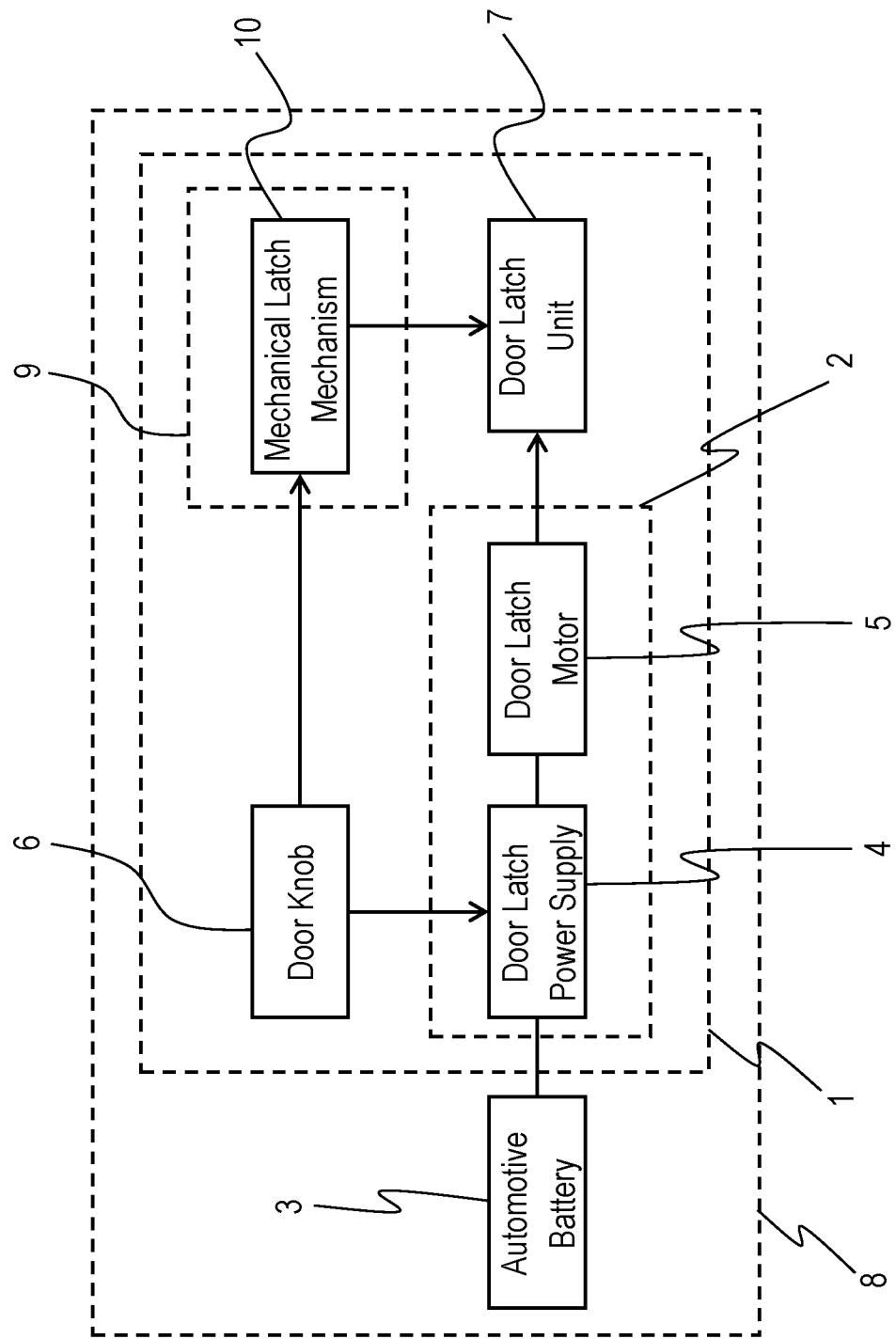

DOOR LATCH POWER SUPPLY DEVICE, DOOR LATCH POWER SUPPLY SYSTEM, AND VEHICLE USING SAME

CROSS-REFERENCE TO RELATED APPLICATIONS

This application is a U.S. national stage application of the PCT international application No. PCT/JP2018/026969 filed on Jul. 18, 2018, which claims the benefit of foreign priority of Japanese patent application No. 2017-176778 filed on Sep. 14, 2017, the contents all of which are incorporated herein by reference.

TECHNICAL FIELD

The present invention relates to a door latch power supply device used for various kinds of vehicles, a door latch power supply system, and a vehicle including the system.

BACKGROUND ART

FIG. 6 is a block diagram of conventional door latch system 1. Door latch system 1 includes normal operation mechanism 2 and emergency operation mechanism 9. Normal operation mechanism 2 includes door latch power supply device 4 that receives power supply from automotive battery 3, and door latch motor 5 driven by door latch power supply device 4. In normal operation mechanism 2 for operating in normal time, an instruction for placing door latch unit 7 in an unlatched state is received from door handle 6 to operate door latch power supply device 4 and door latch motor 5.

Emergency operation mechanism 9, which is a redundant function, places door latch unit 7 in an unlatched state, thereby enabling to enter vehicle 8 for maintenance when automotive battery 3 runs out, e.g., in the case where vehicle 8 is not moved for a long period of time. Emergency operation mechanism 9 includes mechanical latch mechanism 10 operating mechanically in response to an instruction for placing door latch unit 7 in an unlatched state from door handle 6.

A conventional door latch system similar to door latch system 1 is disclosed in, e.g. PTL 1.

CITATION LIST

Patent Literature

PTL 1: International publication No. 2014/156016

SUMMARY

A door latch power supply device includes an electricity storage unit, a charger, a discharger, a contactless power receiver, an input port configured to be connected to an external power supply, an output port configured to be connected to an actuator, and an operation signal receiver configured to receive an operation signal sent in response to an operation for opening a door. While an input voltage input to the input port is higher than or equal to a first input threshold, the charger operates using power supplied from the external power supply so as to cause a storage voltage of the electricity storage unit to become a first storage voltage value, and the discharger outputs power in the electricity storage unit to the output port to place the actuator in the unlatched state in response to the operation signal received by the operation signal receiver. While the input voltage is lower than the first input threshold, the charger operates using power supplied from the contactless power receiver so as to cause the storage voltage to become a second storage voltage value, and then the discharger outputs power in the electricity storage unit to the output port to place the actuator in the unlatched state in response to the operation signal received.

This door latch power supply device reduces the weight of a vehicle.

BRIEF DESCRIPTION OF DRAWINGS

FIG. 6 is a block diagram of a conventional door latch system.

DETAIL DESCRIPTION OF EMBODIMENT

Figure 1:
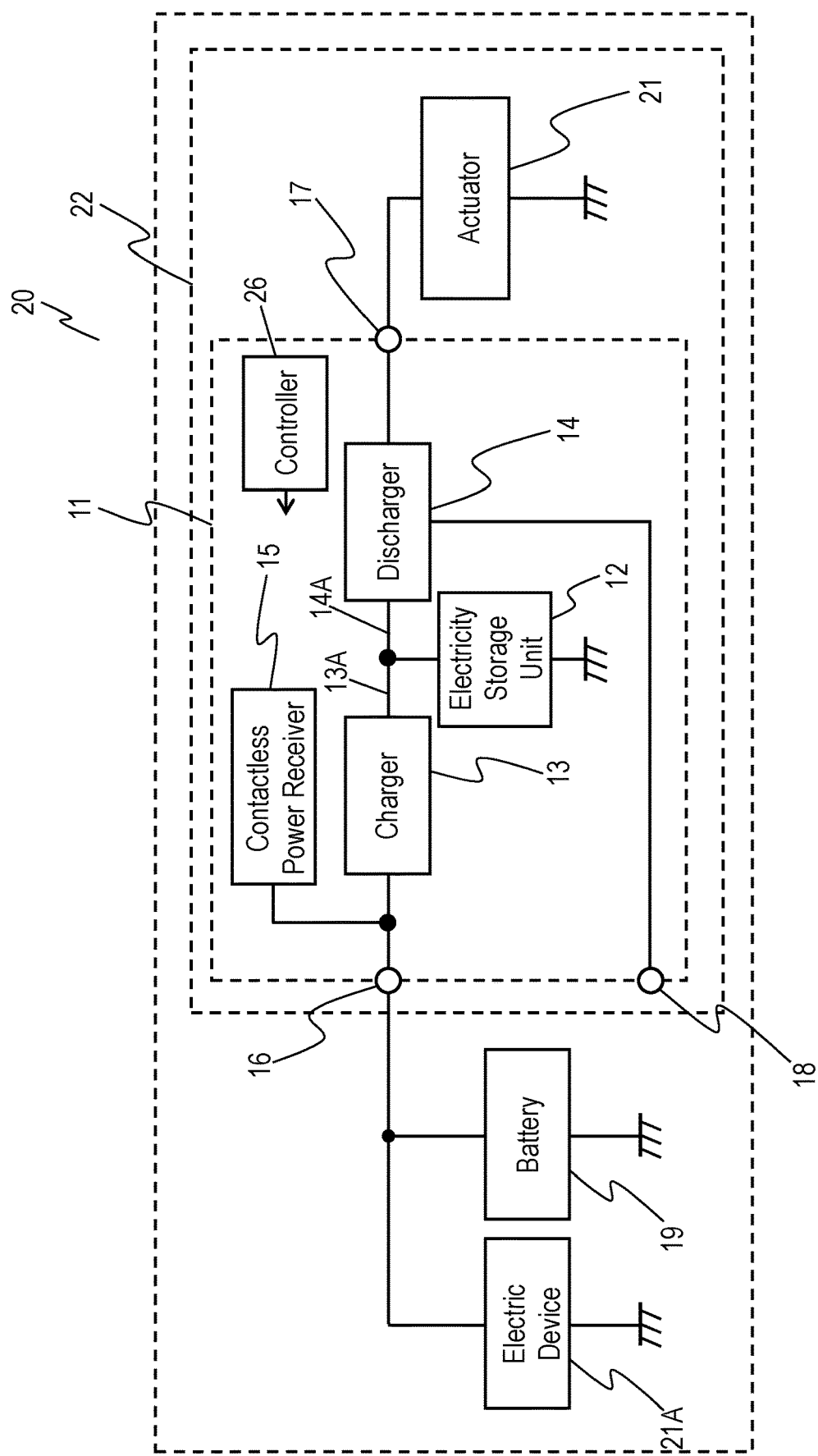
FIG. 1 is a circuit block diagram of a door latch power supply in accordance with an exemplary embodiment.

FIG. 1 is a circuit block diagram of door latch power supply device 11 in accordance with an exemplary embodiment. Door latch power supply device 11 includes electricity storage unit 12, charger 13, discharger 14, contactless power receiver 15, input port 16, output port 17, operation signal receiver 18, and controller 26. Charger 13 is connected to charging path 13A of electricity storage unit 12 to charge electricity storage unit 12. Discharger 14 is connected to discharging path 14A of electricity storage unit 12 to discharge electricity storage unit 12. Contactless power receiver 15 connected to charger 13 is configured to charge electricity storage unit 12 without contact. Input port 16 is connected to charger 13. Output port 17 is connected to discharger 14. Operation signal receiver 18 configured to receive an operation signal generated in the outside of door latch power supply device 11.

Figure 2:
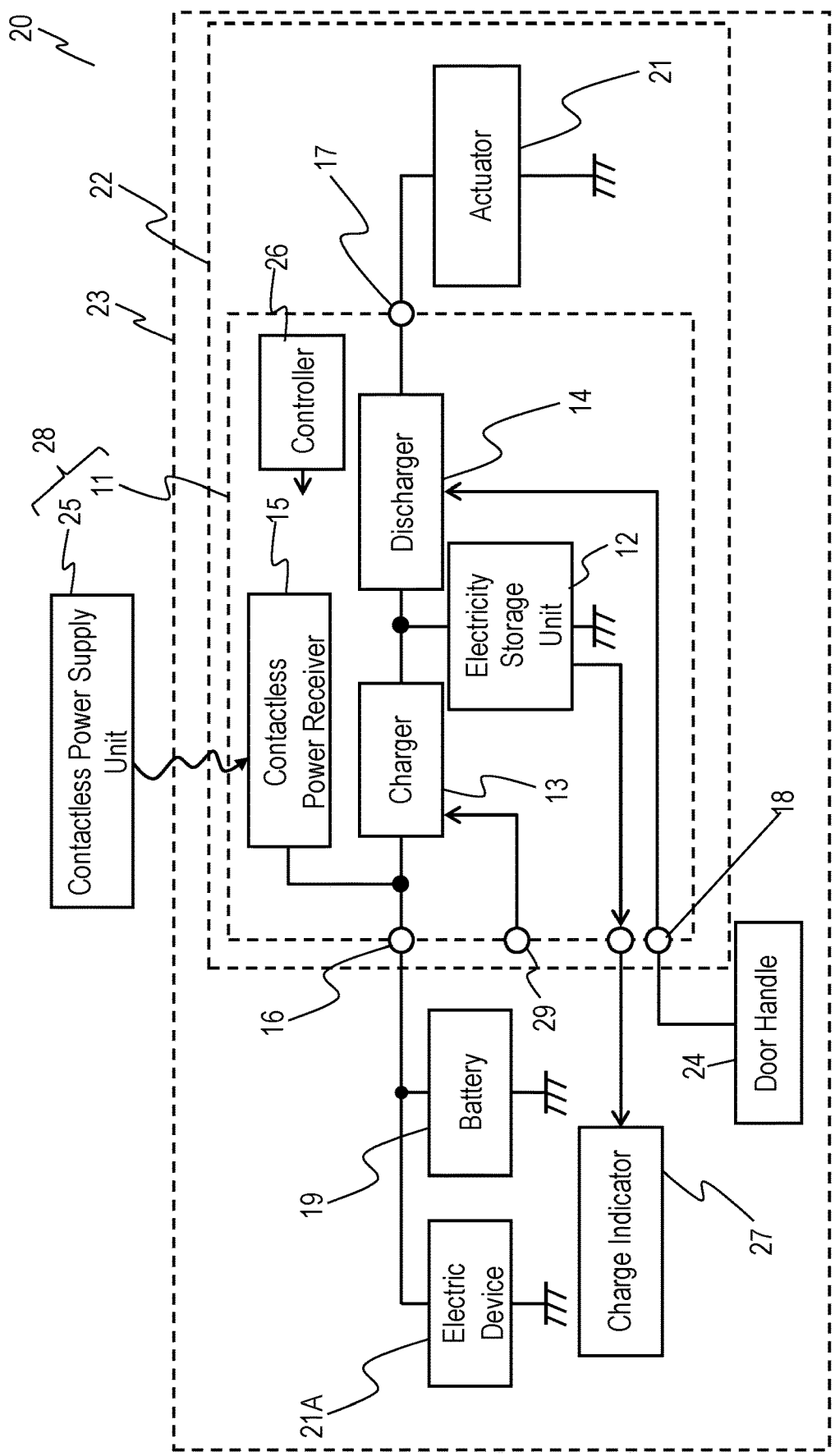
FIG. 2 is a block diagram of a vehicle including the door latch power supply in accordance with the embodiment.
Figure 3:
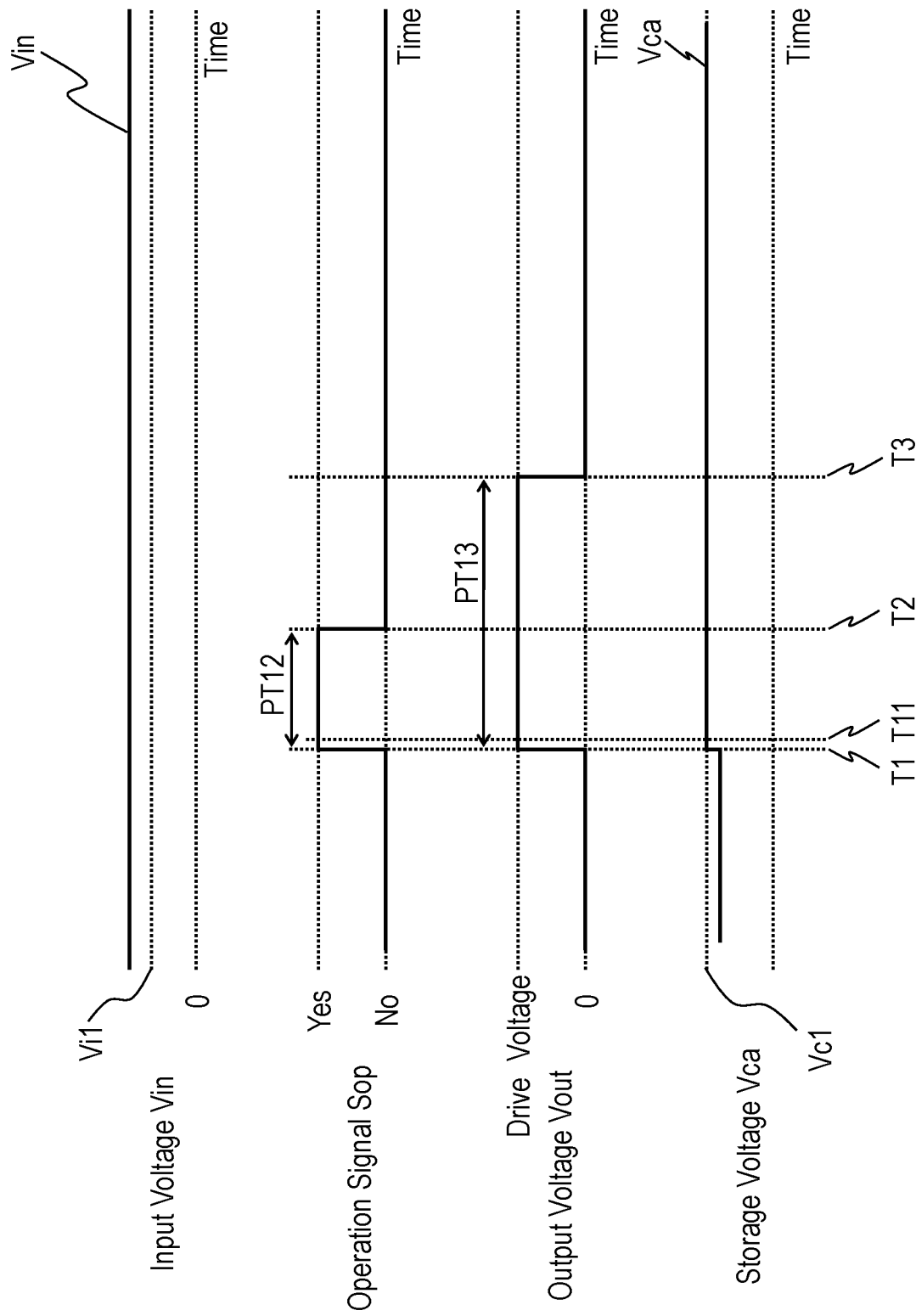
FIG. 3 is a timing chart of an operation of the door latch power supply in accordance with the embodiment.
Figure 4:
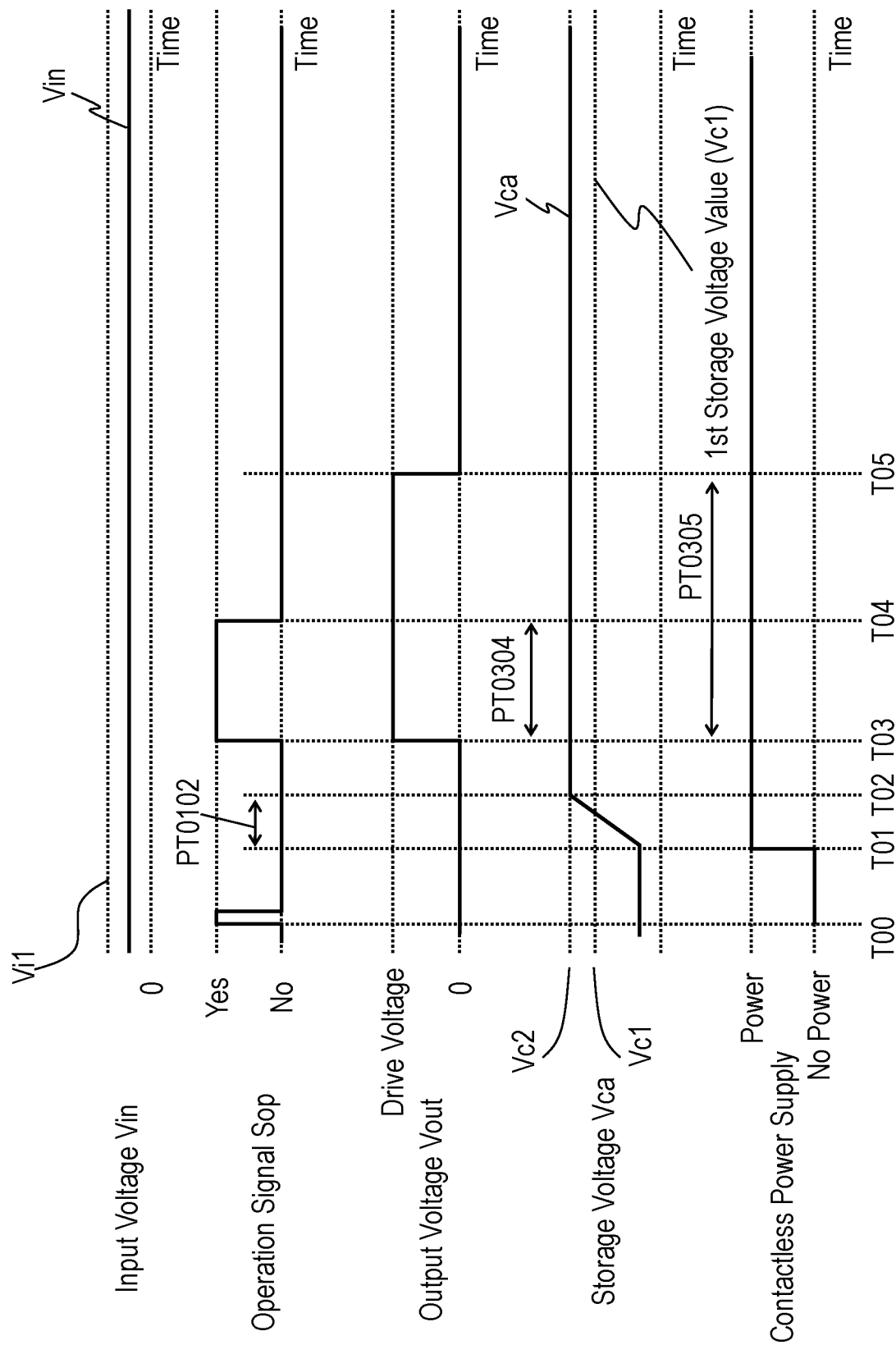
FIG. 4 is a timing chart of an operation of the door latch power supply in accordance with the embodiment.

FIG. 2 is a block diagram of vehicle 20 including door latch power supply device 11. FIG. 3 and FIG. 4 are timing charts of an operation of door latch power supply device 11. The configuration and operation of door latch power supply device 11 will be described below.

Door latch power supply device 11, automotive battery 19 connected to input port 16 of door latch power supply device 11, actuator 21 connected to output port 17 of door latch power supply device 11, and electric device 21A are mounted onto body 23 of vehicle 20. Door 22 is provided in body 23. Door handle 24 connected to operation signal receiver 18 of door latch power supply device 11 is disposed in door 22. Automotive battery 19 is an external power supply provided outside door latch power supply device 11, and is a rechargeable battery, such as a lead storage battery or a lithium ion battery, capable of charging and discharging. Electric device 21A may be, e.g. a car audio device and a car navigation device. Actuator 21 is configured to selectively provide a latched state in which door 22 is latched and an unlatched state in which door 22 is not latched. In the latched state, a fastener is engaged with door 22, so that door 22 is latched and closed. In the unlatched state, a fastener is not engaged with door 22, so that door 22 can be opened. In other words, in the unlatched state, an operator just pulls or pushes door 22, thereby opening door 22. If no power is output from output port 17 of door latch power supply device 11, actuator 21 is in the latched state.

In accordance with the embodiment, actuator 21 is mounted onto body 23. When an operator operates door handle 24, actuator 21 is driven to operate as a result of that. Actuator 21, however, may be a device for opening the door latch.

An operation of vehicle 20 and door latch power supply device 11 performed when an operator rides on vehicle 20 while vehicle 20 is not started will be described below. In other words, this operation is performed under a condition that vehicle 20 is left unused after being started and stopped.

An operator of vehicle 20 operates door handle 24 to open door 22. As mentioned above, door handle 24 is connected to operation signal receiver 18 of door latch power supply device 11. When an operator operates door handle 24, operation signal receiver 18 receives an operation signal in response to the operation.

Door handle 24 may be connected to operation signal receiver 18 directly or indirectly. In other words, door handle 24 may transmit the operation signal, or an electric circuit other than door handle 24 linked to door handle 24 may transmit the operation signal.

Electricity storage unit 12 of door latch power supply device 11 includes one or more electricity storage elements. The electricity storage elements may employ rechargeable batteries or electric double layer capacitors, which can charge and discharge repetitively. The kind of electricity storage elements may be determined depending on an operation specification of door latch power supply device 11. In accordance with the embodiment, door latch power supply device 11 employs an electric double layer capacitor as electricity storage unit 12. Herein, the electric double layer capacitor is excellent in weight saving and characteristics related to large current discharge. FIG. 3 and FIG. 4 are timing charts showing an operation of door latch power supply device 11. FIG. 3 and FIG. 4 show input voltage Vin, operation signal Sop, output voltage Vout, and storage voltage Vca. In FIG. 3 and FIG. 4, horizontal axes indicate time, and vertical axes indicate the above-mentioned voltages and a value of the signal.

First, the operation of door latch power supply device 11 and vehicle 20 when input voltage Vin at input port 16 of door latch power supply device 11 is higher than or equal to input threshold Vi1 will be described with reference mainly to FIG. 3. Input threshold Vi1 is determined to be a minimum value that can operate electric device 21A mounted on vehicle 20. In door latch power supply device 11, input threshold Vi2 lower than input threshold Vi1 is defined. Input threshold Vi2 is set to be a minimum value that can operate charger 13 and discharger 14, or a minimum value required before a boost-up operation in order to obtain a predetermined voltage after the boost-up operation.

Input voltage Vin detected at input port 16 is a voltage of automotive battery 19, and is compared with input threshold Vi1. When input voltage Vin is higher than or equal to input threshold Vi1, automotive battery 19 is determined to be in a preferable state without any deterioration. The operation of comparing input voltage Vin with input threshold Vi1 may be performed repetitively and periodically at predetermined periods when vehicle 20 is left unused, or may be performed when operation signal receiver 18 receives an operation signal.

When controller 26 determines that input voltage Vin is higher than or equal to input threshold Vi1, charger 13 starts operation. The operation of charger 13 may be either of a boost-up operation or a stepping-down operation. Charger 13 charges electricity storage unit 12 so as to cause storage voltage Vca of electricity storage unit 12 to become storage voltage value Vc1. The operation of charger 13 which charges electricity storage unit 12 so as to cause storage voltage Vca of electricity storage unit 12 to become storage voltage value Vc1 may be performed repetitively and periodically at predetermined periods when vehicle 20 is left unused, or may be performed when operation signal receiver 18 receives operation signal Sop, similarly to the comparing operation mentioned above.

When vehicle 20 is stopped last time after completing its start-up, controller 26 operates charger 13 and discharger 14 so as to cause storage voltage Vca of electricity storage unit 12 to become storage voltage value Vc1 which is about 50% or less of a full charge voltage of the electric double layer capacitor in consideration of a life time of the electric double layer capacitor of electricity storage unit 12. After that, electricity storage unit 12 is left unused. This configuration hardly promotes degradation of electricity storage unit 12. If being left unused during the same period of time, the electric double layer capacitor which constitutes electricity storage unit 12 hardly cause a deterioration in voltage as compared with automotive battery 19. But if being left unused for a long time, storage voltage Vca decreases gradually. However, the decreasing amount of storage voltage Vca is small. Accordingly, the operation in which charger 13 charges storage voltage Vca of electricity storage unit 12 to storage voltage value Vc1 may be performed repetitively and periodically at predetermined periods when vehicle 20 is left unused, or may be performed when operation signal receiver 18 receives an operation signal. In both cases, the operation in which electricity storage unit 12 charges storage voltage Vca to storage voltage value Vc1 is completed in an extremely short period of time.

When an operator operates door handle 24 at timing T1, operation signal receiver 18 receives operation signal Sop. As mentioned above, electricity storage unit 12 is charged before timing T1 such that storage voltage Vca becomes storage voltage value Vc1. Alternatively, when operation signal receiver 18 receives operation signal Sop at timing T1, in response to this, charger 13 charges electricity storage unit 12 so as to cause storage voltage Vca to become storage voltage value Vc1 instantly in response to the signal. For the operation of charging electricity storage unit 12 before timing T1 such that storage voltage Vca becomes storage voltage value Vc1, charger 13 may start the above-mentioned operation when external signal receiver 29 of door latch power supply device 11 receives an auxiliary signal from, e.g. a transmitter or the like possessed by an operator. In other words, charger 13 may start the above-mentioned operation when door latch power supply device 11 detects the auxiliary signal transmitted from the transmitter held by the operator which is located away from vehicle 20 approaches vehicle 20. External signal receiver 29 is provided in vehicle 20. Information received by external signal receiver 29 is transmitted to door latch power supply device 11 although external signal receiver 29 is provided in door latch power supply device 11 in the figures.

In period PT12 from timing T1 to timing T2 in which an operator operates door handle 24, or period PT13 from timing T1 to timing T3 which is longer than period PT12, discharger 14 outputs power in electricity storage unit 12 charged to have storage voltage value Vc1 through output port 17 to drive actuator 21. In other words, in period PT12 or period PT13, the power in electricity storage unit 12 is used to place actuator 21 in the unlatched state and allow door 22 to be openable. The operation of discharger 14 may be either of a boost-up operation or a stepping-down operation.

The operation at timing T1 in which charger 13 charges electricity storage unit 12 so as to cause storage voltage Vca to become storage voltage value Vc1 in response to the operation of door handle 24 may be performed simultaneously to the operation in which discharger 14 discharges the power in electricity storage unit 12 to output port 17. Alternatively, when an operator operates door handle 24 at timing T1, charger 13 may charge electricity storage unit 12 so as to cause storage voltage Vca to become storage voltage value Vc1. At subsequent timing T11, discharger 14 may discharge electricity storage unit 12 and output the power in electricity storage unit 12 to output port 17. Alternatively, when an operator operates door handle 24 at timing T1, in response to operation signal Sop transmitted through the above-mentioned operation, charger 13 may first charge electricity storage unit 12 so as to cause storage voltage Vca to become storage voltage value Vc1. After that, discharger 14 may discharge electricity storage unit 12 and start outputting the power in electricity storage unit 12 to output port 17 at subsequent timing T11 when charger 13 completes the above-mentioned charging operation, or immediately after charger 13 completes the above-mentioned charging operation.

While input voltage Vin is higher than or equal to input threshold Vi1, storage voltage Vca is almost equal to storage voltage value Vc1. Therefore, the operation in which charger 13 charges electricity storage unit 12 at timing T1 so as to cause storage voltage Vca of electricity storage unit 12 to become storage voltage value Vc1 may be performed simultaneously to the operation in which discharger 14 discharges electricity storage unit 12 and outputs the power in electricity storage unit 12 to output port 17. Further, while input voltage Vin is higher than or equal to input threshold Vi1, automotive battery 19 is not deteriorated, i.e., is in a preferable state. Thus, even if storage voltage Vca of electricity storage unit 12 is storage voltage value Vc1 lower than a full charge state of the storage unit, power can be supplied to electricity storage unit 12 from charger 13 constantly. Therefore, discharger 14 can drive actuator 21 with no problem.

Next, an operation of door latch power supply device 11 and vehicle 20 at the time when input voltage Vin at input port 16 of door latch power supply device 11 is lower than input threshold Vi1 will be described mainly with reference to FIG. 4.

Input voltage Vin detected by input port 16 is a voltage of automotive battery 19. Input voltage Vin is compared with input threshold Vi1. When input voltage Vin is lower than input threshold Vi1, automotive battery 19 is determined to be deteriorated, i.e., not in a preferable state. Herein, the operation related to a comparison between input voltage Vin and input threshold Vi1 may be performed repetitively and periodically at predetermined periods when vehicle 20 is left unused, or may be performed when operation signal receiver 18 receives operation signal Sop.

The operations of comparison and determination mentioned here are performed by controller 26 described later. Controller 26 is able to operate at a low voltage even if the voltage of automotive battery 19 is low and automotive battery 19 is deteriorated, i.e., not in a preferable state. Therefore, fundamental control, comparison, and determination are performed almost constantly or at any timing. In other words, controller 26 can operate even if the output voltage of automotive battery 19 has a value lower than input threshold Vi1 although input threshold Vi1 is set as a voltage necessary to operate electric device 21A mounted on vehicle 20, charger 13, and discharger 14. Charge indicator 27 may indicate that automotive battery 19 is deteriorated.

At the timing when external signal receiver 29 provided in door latch power supply device 11 receives an auxiliary signal from a transmitter possessed by an operator, controller 26 may start operation to perform determination and display.

Alternatively, based on the fact that actuator 21 is in the latched state without being energized, i.e., actuator 21 does not change to the unlatched state, an operator may estimate that automotive battery 19 has run out when operating door handle 24. Typically, if vehicle 20 is not started over a long period of time, e.g., half a year or one or more years, or if power is continuously supplied to a load, such as a light of vehicle 20, for a long time without charging, automotive battery 19 runs out. Therefore, if actuator 21 is in the latched state without being energized, i.e., does not change to the unlatched state, an operator may estimate or determined that automotive battery 19 runs out. If degradation of automotive battery 19 progresses significantly to cease operation of controller 26, an operator estimates or determines that.

If input voltage Vin is determined to be lower than input threshold Vi1, neither charger 13 nor discharger 14 operate fundamentally, or controller 26 operates neither charger 13 nor discharger 14. This situation corresponds to the state before timing T00 in FIG. 4. For instance, when an operator operates door handle 24 at timing T00, if operation signal receiver 18 receives operation signal Sop and input voltage Vin is determined to be lower than input threshold Vi1 at timing T00, neither charger 13 nor discharger 14 operates.

In this case, power is supplied to contactless power receiver 15 from outside of vehicle 20. Specifically, at timing T01, the operator causes contactless power supply unit 25, which is a power supply separate from vehicle 20, to approach contactless power receiver 15 of door latch power supply device 11 so as to supply power to contactless power receiver 15 from contactless power supply unit 25. Thus, charger 13 starts the operation of charging electricity storage unit 12 at timing T01. The supply of power from contactless power supply unit 25 to contactless power receiver 15 is performed during period PT0102 from timing T01 to timing T02 until storage voltage Vca of electricity storage unit 12 reaches storage voltage value Vc2. In other words, the operation in which charger 13 charges electricity storage unit 12 is performed from timing T01 to timing T02. The operation of charger 13 may be either of a boost-up operation or a stepping-down operation.

In FIG. 4, storage voltage Vca increases from timing T01 to timing T02 along a straight trajectory. The trajectory of storage voltage Vca changes depending on a coupling status between contactless power supply unit 25 and contactless power receiver 15, or charge characteristics of electricity storage unit 12. Therefore, the trajectory of storage voltage Vca is not necessarily a straight line. Further, in FIG. 4, the supply of power from contactless power supply unit 25 to contactless power receiver 15 is performed continuously even after timing T01. The supply of power, however, may be completed at timing T02.

Next, after timing T02, i.e., after electricity storage unit 12 is charged completely until storage voltage Vca reaches storage voltage value Vc2, operation signal receiver 18 receives operation signal Sop when an operator operates door handle 24 at timing T03. In response to the signal, discharger 14 starts operation of discharging electricity storage unit 12 at timing T03. Furthermore, in period PT0304 from timing T03 to timing T04 in which the operator operates door handle 24, or period PT0305 from timing T03 to timing T05 which is longer than period PT0304, discharger 14 outputs, to output port 17, power in electricity storage unit 12, which has been charged to cause storage voltage Vca to substantially become storage voltage value Vc2, so as to drive actuator 21. In other words, during period PT0304 or period PT0305, actuator 21 is driven by the power in electricity storage unit 12, thereby changing to the unlatched state from the latched state. The operation of discharger 14 may be any of a boost-up operation, a stepping-down operation, or an operation of discharging the voltage of electricity storage unit 12 as it is.

In period PT0305 from timing T03 to timing T05, limited power stored in electricity storage unit 12 is output to output port 17 from discharger 14 although no power is supplied to electricity storage unit 12 from automotive battery 19. Accordingly, only discharger 14 is preferably operated during period PT0305 without operating charger 13.

In the above-mentioned operation, if run-out of battery or large degradation occurs in automotive battery 19 when vehicle 20 is not started over a long period of time, door latch power supply device 11 places door 22 of vehicle 20 in the unlatched state, thereby enabling the operator to enter vehicle 20 to perform maintenance of vehicle 20.

Conventional door latch system 1 shown in FIG. 6 includes mechanical latch mechanism 10 as emergency operation mechanism 9. This configuration increases the volume and the weight of the system. The weight of vehicle 8 increases accordingly, and causes fuel consumption of vehicle 8 to deteriorate.

Door latch power supply device 11 in accordance with the embodiment does not include mechanical latch mechanism 10 which is a redundant function that operates as emergency operation mechanism 9 of conventional door latch system 1. Thus, the weight of vehicle 20 is reduced accordingly.

In door latch power supply system 28 including door latch power supply device 11 and contactless power supply unit 25 which is a power supply located from vehicle 20, power may be supplied to door latch power supply device 11 from another power supply, instead of contactless power supply unit 25. Contactless power supply unit 25 may be driven by commercial power or a portable battery. A service of vehicle 20 may possess contactless power supply unit 25. Alternatively, a contactless power supply device for portable communication equipment or the like may be used as contactless power supply unit 25.

Storage voltage value Vc2 is preferably higher than storage voltage value Vc1. As mentioned above, in consideration of a life time of electricity storage unit 12, storage voltage value Vc1 is set to be lower than a full charge voltage of electricity storage unit 12, i.e., is set to about 50% of the full charge voltage, and is a value at which an influence on the life time is small.

On the other hand, storage voltage value Vc2 corresponds to an electricity storage amount obtained by storing the power received from contactless power supply unit 25 when the power of automotive battery 19 is insufficient. Accordingly, if operable time of door latch power supply device 11 is long, storage voltage value Vc2 is preferably higher than storage voltage value Vc1, i.e., 80% or more of the full charge voltage, or is set as a value of a full charge level.

Charge indicator 27 is preferably provided in any one of vehicle 20, body 23, door 22, and door latch power supply devices 11. Charge indicator 27 indicates an electricity storage completion state when electricity storage unit 12 is charged from contactless power supply unit 25 through contactless power receiver 15 and charger 13 to cause storage voltage Vca of electricity storage unit 12 to reach storage voltage value Vc2, in other words, when the power stored in electricity storage unit 12 reaches a value enough to drive actuator 21. Charge indicator 27 allows an operator to visually recognize the charging state of electricity storage unit 12 easily, thereby enabling suitable power supply from contactless power supply unit 25.

As mentioned above, while input voltage Vin is lower than input threshold Vi1, if operation signal receiver 18 receives operation signal Sop, charge indicator 27 may indicate that automotive battery 19 is in an abnormal state. Thus, the operator can visually recognize the state of automotive battery 19 easily.

The above-mentioned operation of door latch power supply device 11 and vehicle 20 have been described in both the case where the input voltage at input port 16 of door latch power supply device 11 is higher than or equal to input threshold Vi1, and the case where the input voltage at input port 16 of door latch power supply device 11 is lower than input threshold Vi1. In the case where the input voltage at input port 16 of door latch power supply device 11 is lower than input threshold Vi1, the above-mentioned operation may be further divided with reference to a threshold of storage voltage Vca. This operation will be described below.

While input voltage Vin is lower than input threshold Vi1 and storage voltage Vca of electricity storage unit 12 is higher than or equal to storage voltage value Vc3, controller 26 does not operate charger 13. At this moment, storage voltage Vca of electricity storage unit 12 is generated by the power which is charged when vehicle 20 is stopped last time after completing its start-up and which remains while decreasing, as mentioned above.

When operation signal Sop is received by operation signal receiver 18, discharger 14 outputs power in electricity storage unit 12 to output port 17. On the other hand, while input voltage Vin is lower than input threshold Vi1 and storage voltage Vca is lower than storage voltage value Vc3, charger 13 operates using power supplied from contactless power receiver 15 so as to cause storage voltage Vca to become storage voltage value Vc2. After that, when operation signal Sop is received, discharger 14 outputs the power in electricity storage unit 12 to output port 17.

Storage voltage value Vc3 is set to meet the following condition. Even in the case that input voltage Vin is lower than input threshold Vi1 and the power stored in automotive battery 19 is insufficient, while storage voltage Vca is higher than or equal to storage voltages Vc3 and power remains in electricity storage unit 12, actuator 21 is placed in the unlatched state from the latched state operation signal Sop is received even if electricity storage unit 12 is not charged. Storage voltage value Vc3 may be lower than storage voltage value Vc1. Storage voltage value Vc3 is determined to be a minimum value that can operate charger 13 and discharger 14, or a minimum value required before a boost-up operation in order to obtain a predetermined voltage in discharger 14 after the boost-up operation.

For instance, if input voltage Vin has a value enabling charger 13, discharger 14, and controller 26 to start or operate, although not enabling electric device 21A mounted on vehicle 20 to start or operate, charger 13 may be operated when operation signal receiver 18 receives operation signal Sop. In other words, this state corresponds to the case where input voltage Vin is lower than input threshold Vi1, and cannot start or operate electric device 21A mounted on vehicle 20. Furthermore, this state corresponds to the case where input voltage Vin has a value enabling charger 13 and controller 26 to start or operate although input voltage Vin is lower than input threshold Vi1.

Under the above-mentioned condition, electricity storage unit 12 can be charged so as to cause storage voltage Vca to become storage voltage value Vc2 or storage voltage value Vc3 regardless of the value of storage voltage Vca before charging. When operation signal Sop is received, the power charged in electricity storage unit 12 is discharged, thereby allowing actuator 21 to be placed in the unlatched state in which door 22 is unlatched. Therefore, even when automotive battery 19 is deteriorated to a level disabling electric device 21A to operate, if automotive battery 19 is in a level enabling charger 13 to operate to charge electricity storage unit 12, actuator 21 can be placed in the unlatched state.

When input voltage Vin is lower than the value enabling charger 13, discharger 14, and controller 26 to start or operate, charger 13 is operated to charge electricity storage unit 12 so as to cause the storage voltage of electricity storage unit 12 to become storage voltage value Vc2 using power supplied from contactless power receiver 15, as mentioned above. Alternatively, the power supplied from contactless power receiver 15 may be used to energize controller 26, thereby performing to energize controller 26 and charge electricity storage unit 12 simultaneously.

In the above description, a relationship between the operation of each element constituting door latch power supply device 11 and operation signal Sop from door handle 24 or the voltage of automotive battery 19 are shown. Door latch power supply device 11 shown in FIG. 1 and FIG. 2 does not necessarily include controller 26. In this case, charger 13 and discharger 14 are operated based on input voltage Vin, storage voltage Vca, and operation signal Sop.

Figure 5:
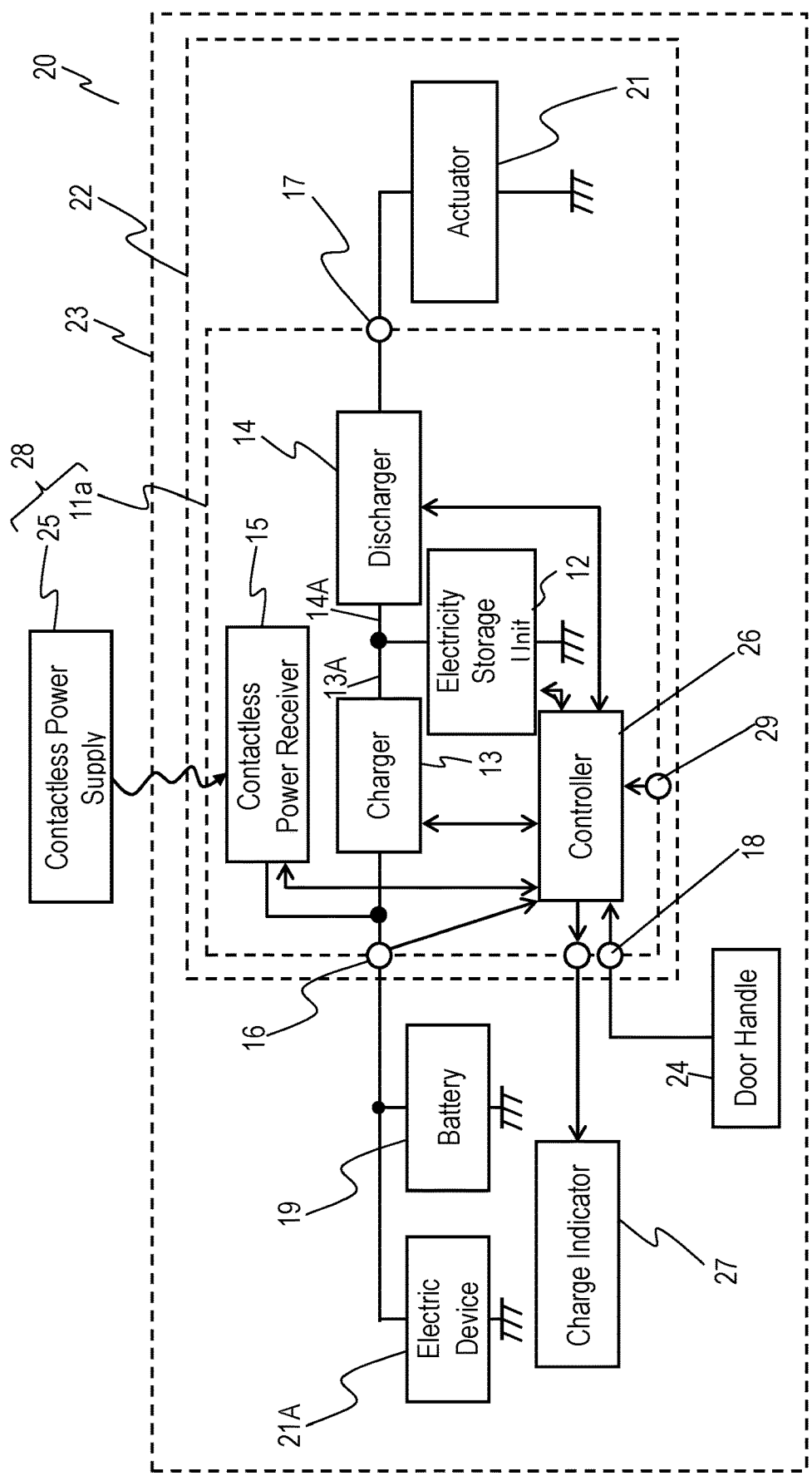
FIG. 5 is a block diagram of a vehicle including another door latch power supply in accordance with the embodiment.

FIG. 5 is a block diagram of vehicle 20 including another door latch power supply devices 11a in accordance with the embodiment. Door latch power supply device 11a includes controller 26.

In door latch power supply device 11a, controller 26 detects and determines input voltage Vin and storage voltage Vca, and detects operation signal Sop, and controls operation of charger 13 and discharger 14. Controller 26 is not necessarily arranged integrally as an element or a circuit. Controller 26 may be arranged such that the function thereof is distributed to electricity storage unit 12, charger 13, and discharger 14. Further, power for driving controller 26 is supplied from automotive battery 19 or electricity storage unit 12. Further, when the power stored in automotive battery 19 and electricity storage unit 12 is insufficient, i.e., not enough to drive controller 26, if power is supplied to contactless power receiver 15 from contactless power supply unit 25, the power is used to energize controller 26 and perform the above-mentioned operation.

As mentioned above, while the input voltage at input port 16 is higher than or equal to the input threshold, charger 13 operates so as to cause storage voltage Vca of electricity storage unit 12 to become storage voltage value Vc1. In response to operation signal Sop received by operation signal receiver 18, discharger 14 outputs the power in electricity storage unit 12 to output port 17.

Further, while the input voltage at input port 16 is lower than input threshold Vi1, charger 13 operates so as to storage voltage Vca of electricity storage unit 12 to become storage voltage value Vc2 using power supplied from contactless power receiver 15. After that, in response to operation signal Sop received by operation signal receiver 18, discharger 14 outputs the power in electricity storage unit 12 to output port 17.

With the above configuration and operation, even if the power stored inside door latch power supply device 11 (11a) or inside vehicle 20, such as automotive battery 19 mounted on vehicle 20, is decreased to a level disabling to drive actuator 21, door latch power supply device 11 (11a) can easily supply power for driving actuator 21 since door latch power supply device 11 (11a) employs contactless power supply unit 25 to charge electricity storage unit 12 from the outside of vehicle 20, i.e., the outside of door latch power supply device 11 (11a), by contactless power supply.

Accordingly, even if automotive battery 19 runs out while vehicle 20 is started over a long period of time, door latch power supply device 11 (11a) can drive actuator 21, so that door 22 of vehicle 20 can be placed in the unlatched state. Therefore, an operator can enter vehicle 20 to perform maintenance of vehicle 20. As a result, the mechanical latch mechanism which is a redundant function that operates as an emergency operation mechanism, can be eliminated, thereby reducing the weight of vehicle 20.

As mentioned above, door latch power supply device 11 (11a) is configured to be connected to actuator 21 and an external power supply (automotive battery 19). Actuator 21 is configured to provide a latched state in which door 22 is latched and an unlatched state in which door 22 is not latched. Door latch power supply device 11 (11a) includes electricity storage unit 12, charger 13 connected to charging path 13A of electricity storage unit 12, discharger 14 connected to discharging path 14A of electricity storage unit 12, contactless power receiver 15 connected to charger 13 and configured to receive power without contact, input port 16 connected to charger 13 and configured to be connected to an external power supply, output port 17 connected to discharger 14, and operation signal receiver 18 configured to receive operation signal Sop sent in response to an operation of opening door 22. Input port 16 is configured to be connected to the external power supply. Output port 17 is configured to be connected to actuator 21. While input voltage Vin to be input to input port 16 is higher than or equal to input threshold Vi1, charger 13 operates using power supplied from the external power supply so as to cause storage voltage Vca of electricity storage unit 12 to become storage voltage value Vc1. At this moment, in response to operation signal Sop received by operation signal receiver 18, discharger 14 outputs the power in electricity storage unit 12 to output port 17 to place actuator 21 in the unlatched state from the latched state. While input voltage Vin is lower than input threshold Vi1, charger 13 operates using power supplied from contactless power receiver 15 so as to cause storage voltage Vca to become storage voltage value Vc2. Then, in response to operation signal Sop received, discharger 14 outputs the power in electricity storage unit 12 to output port 17 to place actuator 21 in the unlatched state from the latched state.

Electricity storage unit 12 includes an electric double layer capacitor. Storage voltage value Vc1 is lower than a full charge voltage of the electric double layer capacitor.

Storage voltage value Vc2 is higher than storage voltage value Vc1.

When storage voltage Vca is increased to reach a value equal to or higher than storage voltages Vc2 by the power supplied from contactless power receiver 15, charge indicator 27 indicates an electricity storage completion state.

While input voltage Vin is higher than or equal to input threshold Vi1, charger 13 operates in response to an auxiliary signal sent by an operator so as to cause storage voltage Vca of electricity storage unit 12 to become storage voltage value Vc1 using power supplied from the external power supply. While input voltage Vin is lower than input threshold Vi1, charger 13 operates in response to the auxiliary signal so as to cause storage voltage Vca to become storage voltage value Vc2 using power supplied from contactless power receiver 15. Then, in response to operation signal Sop received, discharger 14 outputs the power in electricity storage unit 12 to output port 17 to place actuator 21 in the unlatched state from the latched state.

While input voltage Vin is higher than or equal to input threshold Vi1, charger 13 operates using the power supplied from the external power supply so as to cause storage voltage Vca of electricity storage unit 12 to become storage voltage value Vc1. At this moment, in response to operation signal Sop received by operation signal receiver 18, discharger 14 outputs the power in electricity storage unit 12 to output port 17 to place actuator 21 in the unlatched state from the latched state. While input voltage Vin is lower than input threshold Vi1 and storage voltage Vca is higher than or equal to storage voltage value Vc3, charger 13 does not operate, and discharger 14 outputs power in electricity storage unit 12 to output port 17 to place actuator 21 in the unlatched state from the latched state in response to operation signal Sop received by operation signal receiver 18. While input voltage Vin is lower than input threshold Vi1 and storage voltage Vca is lower than storage voltage value Vc3, charger 13 operates using the power supplied from contactless power receiver 15 so as to cause storage voltage Vca to become storage voltage value Vc2. Then, in response to operation signal Sop received, discharger 14 outputs the power in electricity storage unit 12 to output port 17 to place actuator 21 in the unlatched state from the latched state.

While input voltage Vin is higher than or equal to input threshold Vi1, charger 13 operates using the power supplied from the external power supply so as to cause storage voltage Vca of electricity storage unit 12 to become storage voltage value Vc1. At this moment, in response to operation signal Sop received by operation signal receiver 18, discharger 14 outputs the power in electricity storage unit 12 to output port 17 to place actuator 21 in the unlatched state from the latched state. While input voltage Vin is lower than input threshold Vi1 and higher than or equal to input threshold Vi2 that can operate charger 13 and discharger 14, charger 13 and discharger 14 operate to output power in electricity storage unit 12 to output port 17 in response to operation signal Sop received by operation signal receiver 18, so that actuator 21 is placed in the unlatched state from the latched state. While input voltage Vin is lower than input threshold Vi1 and lower than input threshold Vi2, charger 13 operates using the power supplied from contactless power receiver 15 so as to cause storage voltage Vca to become storage voltage value Vc2. Then, in response to operation signal Sop received, discharger 14 outputs the power in electricity storage unit 12 to output port 17 to place actuator 21 in the unlatched state from the latched state.

INDUSTRIAL APPLICABILITY

A door latch power supply according to the present invention provides an effect of reducing the weight of a vehicle including the door latch power supply, and is useful for various kinds of vehicles.

REFERENCE MARKS IN THE DRAWINGS 11, 11a door latch power supply device
12 electricity storage unit
13 charger
14 discharger
15 contactless power receiver
16 input port
17 output port
18 operation signal receiver
19 automotive battery
20 vehicle
21 actuator
22 door
23 body
24 door handle
25 contactless power supply unit
26 controller
27 charge indicator
28 door latch power supply system
29 external signal receiver

The invention claimed is:

1. A door latch power supply device configured to be connected to an actuator and an external power supply, the actuator providing a latched state in which a door is latched and an unlatched state in which the door is not latched, the door latch power supply device comprising:
an electricity storage unit;
a charger connected to a charging path of the electricity storage unit;
a discharger connected to a discharging path of the electricity storage unit;
a contactless power receiver connected to the charger and configured to receive power without contact;
an input port connected to the charger, the input port being configured to be connected to the external power supply;
an output port connected to the discharger, the output port being configured to be connected to the actuator; and
an operation signal receiver configured to receive an operation signal sent in response to an operation for opening the door, wherein
while an input voltage input to the input port is higher than or equal to a first input threshold, the charger operates using power supplied from the external power supply so as to cause a storage voltage of the electricity storage unit to become a first storage voltage value, and the discharger outputs power in the electricity storage unit to the output port to place the actuator in the unlatched state in response to the operation signal received by the operation signal receiver, and
while the input voltage is lower than the first input threshold, the charger operates using power supplied from the contactless power receiver so as to cause the storage voltage to become a second storage voltage value, and then the discharger outputs power in the electricity storage unit to the output port to place the actuator in the unlatched state in response to the operation signal received by the operation signal receiver.

2. The door latch power supply device according to claim 1, wherein
the electricity storage unit includes an electric double layer capacitor, and
the first storage voltage value is lower than a full charge voltage of the electric double layer capacitor.

3. The door latch power supply device according to claim 2, wherein the second storage voltage value is higher than the first storage voltage value.

4. The door latch power supply device according to claim 1, further comprising a charge indicator that indicates an electricity storage completion state, when the storage voltage is increased to the second storage voltage or more by the power supplied from the contactless power receiver.

5. The door latch power supply device according to claim 1, wherein
while the input voltage is higher than or equal to the first input threshold, the charger operates in response to an auxiliary signal sent by an operator so as to cause the storage voltage of the electricity storage unit to become the first storage voltage value using the power supplied from the external power supply, and
while the input voltage is lower than the first input threshold, the charger operates, in response to the auxiliary signal, so as to cause the storage voltage to become the second storage voltage value using the power supplied from the contactless power receiver, and then the discharger outputs the power in the electricity storage unit to the output port in response to the operation signal received by the operation signal receiver.

6. The door latch power supply device according to claim 1, wherein
while the input voltage is higher than or equal to the first input threshold, the charger operates using the power supplied from the external power supply so as to cause the storage voltage of the electricity storage unit to become the first storage voltage value, and the discharger outputs the power in the electricity storage unit to the output port in response to the operation signal received by the operation signal receiver,
while the input voltage is lower than the first input threshold and the storage voltage is higher than or equal to a third storage voltage value, the charger dose not operate and the discharger outputs the power in the electricity storage unit to the output port in response to the operation signal received by the operation signal receiver, and
while the input voltage is lower than the first input threshold and the storage voltage is lower than the third storage voltage value, the charger operates using the power supplied from the contactless power receiver so as to cause the storage voltage to become the second storage voltage value, and then the discharger outputs the power in the electricity storage unit to the output port in response to the operation signal received by the operation signal receiver.

7. The door latch power supply device according to claim 1, wherein:
while the input voltage is higher than or equal to the first input threshold, the charger operates using the power supplied from the external power supply so as to cause the storage voltage of the electricity storage unit to become the first storage voltage value, and the discharger outputs the power in the electricity storage unit to the output port in response to the operation signal received by the operation signal receiver,
while the input voltage is lower than the first input threshold and higher than or equal to a second input threshold that enables the charger and the discharger to operate, the charger and the discharger operate to output power in the electricity storage unit to the output port in response to the operation signal received by the operation signal receiver, and while the input voltage is lower than the first input threshold and lower than the second input threshold, the charger operates using the power supplied from the contactless power receiver so as to cause the storage voltage to become the second storage voltage value, and then the discharger outputs the power in the electricity storage unit to the output port in response to the operation signal received by the operation signal receiver.

8. A door latch power supply system comprising:
the door latch power supply device according to claim 1; and
a contactless power supply unit independent of the door latch power supply device, wherein
power is supplied to the electricity storage unit from the contactless power supply unit through the contactless power receiver and the charger.

9. A vehicle comprising:
a body;
an automotive battery mounted on the body;
a door provided in the body;
a door handle for opening the door;
an actuator providing a latched state in which the door is latched and an unlatched state in which the door is not latched; and
a door latch power supply device connected to the actuator and the automotive battery, wherein
the door latch power supply device includes:
an electricity storage unit;
a charger connected to a charging path of the electricity storage unit;
a discharger connected to a discharging path of the electricity storage unit;
a contactless power receiver connected to the charger and configured to receive power without contact;
an input port connected to the automotive battery and the charger;
an output port connected to the actuator and the discharger; and
an operation signal receiver configured to receive an operation signal sent in response to an operation of the door handle,
while an input voltage input to the input port is higher than or equal to a first input threshold, the charger operates using power supplied from the automotive battery so as to cause a storage voltage of the electricity storage unit to become a first storage voltage value, and the discharger outputs power in the electricity storage unit to the output port to place the actuator in the unlatched state in response to the operation signal received by the operation signal receiver, and
while the input voltage is lower than the first input threshold, the charger operates using power supplied from the contactless power receiver so as to cause the storage voltage to become a second storage voltage value, and then the discharger outputs power in the electricity storage unit to the output port to place the actuator in the unlatched state in response to the operation signal received by the operation signal receiver.

\* \* \* \* \*